March 4, 1941.　　　C. E. TANNEWITZ　　　2,233,562
BAND SAW WHEEL AND TIRE THEREFOR
Filed June 3, 1940

INVENTOR.
Carl E. Tannewitz
BY Earl & Chappell
ATTORNEYS.

Patented Mar. 4, 1941

2,233,562

UNITED STATES PATENT OFFICE 2,233,562

BAND SAW WHEEL AND TIRE THEREFOR

Carl E. Tannewitz, Grand Rapids, Mich.

Application June 3, 1940, Serial No. 338,588

11 Claims. (Cl. 74—230.24)

The main objects of this invention are:

First, to provide a band saw tire having a rubber or resilient facing or tread in which the facing or tread is effectively anchored and secured throughout.

Second, to provide a demountable band saw tire which has a forced fit with its cooperating band saw wheel rim and at the same time may be quite easily applied or removed.

Third, to provide a band saw tire embodying these advantages which is comparatively simple and economical in its parts and the assembly thereof and very durable in use.

Objects relating to details and economies of the invention will appear from the description to follow. The invention is defined and pointed out in the claims.

Preferred embodiments of the invention are illustrated in the accompanying drawing, in which.

Figure 1:
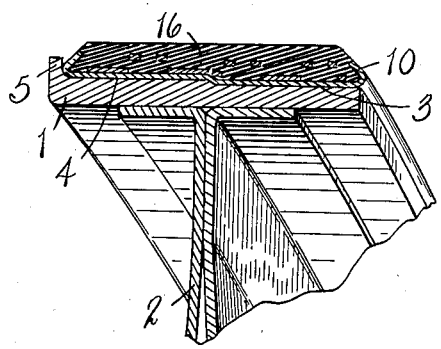
Fig. 1 is a fragmentary sectional view through the band saw wheel and tire embodying the features of my invention.

Referring to the drawing, the band saw wheel rim 1 is, in the embodiment illustrated, mounted upon a wheel having the web type of spokes 2. The periphery of the rim has annular steps 3 and 4 with a rim stop flange 5 at one edge.

Figure 2:
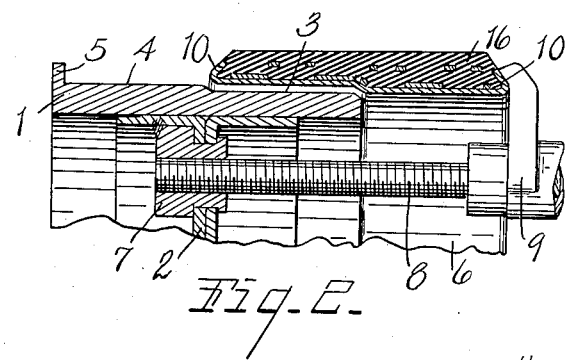
Fig. 2 is a fragmentary section illustrating the manner of assembling the tire upon the wheel.
Figure 4:
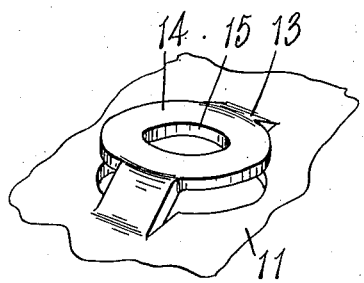
Fig. 4 is an enlarged fragmentary perspective view of a tire facing or anchoring member and one of its anchoring elements.
Figure 3:
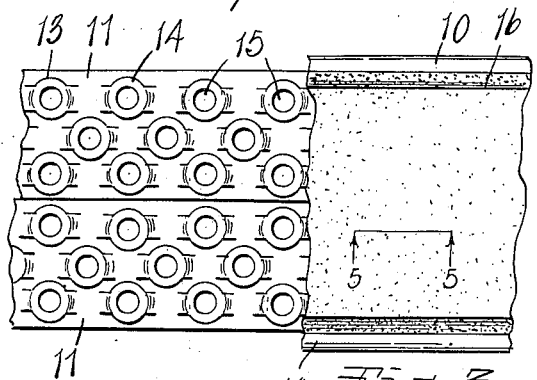
Fig. 3 is a fragmentary plan view showing structural details of the tire.

My improved tire comprises the annular tire rim 6 which is internally stepped to complement the wheel rim and is a forced fit thereon, being however removable. This stepping of the tire rim and the wheel rim permits quick assembly as it will be evident by a reference to Fig. 2 that the tire may be previously slipped onto the rim until the coacting steps come into engagement.

I preferably provide a wheel with a plurality of internally threaded nut-like members 7 with which the screws 8 may be engaged, the screw carrying thrust member 9 engageable with the tire. I have not shown the means for actuating the screw.

Figure 5:
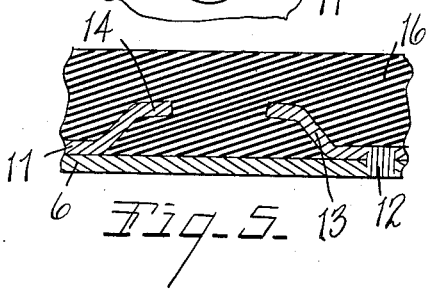
Fig. 5 is an enlarged fragmentary sectional view on line 5—5 of Fig. 3 showing the relation of the anchoring members and their elements to the tire rim and to the tire facing.
Figure 7:
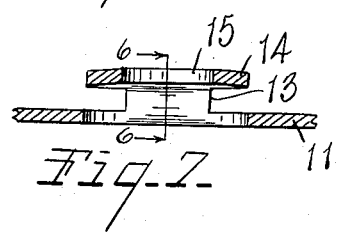
Fig. 7 is a fragmentary section on line 7—7 of Fig. 6.

The tire rim 6 is provided with inturned edge flanges 10 and has anchoring members 11 formed of strips of metal of approximately the width of the steps of the tire rim embracing the steps and spot-welded thereto as indicated at 12 in Fig. 5.

These anchoring members have rows of loop-like anchoring elements 13 struck up therefrom, the bight portions 14 of the anchoring elements being annular and or provided with openings 15 of substantial diameter. The anchoring elements of adjacent rows are arranged in alternating relation and this permits the bight portions to be of substantial width or diameter without bringing the slits formed in the anchoring members unduly close together. Further, it results in a very uniform distribution of the anchoring elements.

Figure 8:
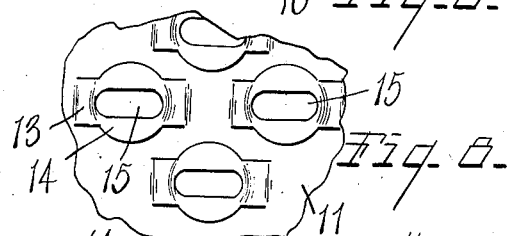
Fig. 8 is an enlarged fragmentary plan view of a slightly modified embodiment of my invention.
Figure 6:
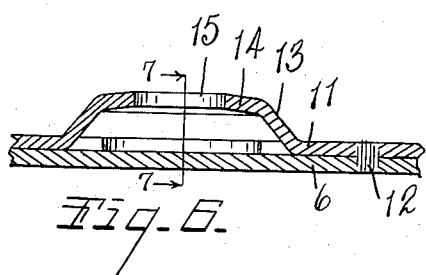
Fig. 6 is a fragmentary section similar to Fig. 5 and taken on a line corresponding to line 6—6 of Fig. 7 showing details of the tire facing anchoring members.

In the embodiment shown in Fig. 8, the holes 15 are elongated circumferentially of the tire and this has the advantage of somewhat increasing the area of the holes.

It will be noted that the bight portions of the anchoring elements are substantially spaced from the base or body portions of the anchoring members. This is desirable as it affords a very effective engagement of the anchoring members with the tire facing 16 which is preferably of rubber molded and vulcanized on the tire rim with the anchoring elements embedded therein and with the edges extending under the inturned flanges 10. This provides a very effective anchorage for the tire facing or tread throughout and at the same time there are no points or zones in the facing that are unduly restricted by the anchoring elements.

Band saw tires embodying my invention are very desirable in providing an effective rubber facing or tread which is very firmly anchored with a result that the structure is durable and safe, the latter feature, as will be appreciated, being highly important. The step feature is also important in that it greatly facilitates the assembling and disassembling of the tire on the wheel rim and at the same time permits a very close forced fit of the parts without requiring undue effort in assembling and disassembling.

I have illustrated and described my invention in a very practical embodiment thereof. I have not attempted to illustrate or describe other embodiments or adaptations as it is believed that this disclosure will enable those skilled in the art to embody my invention as may be desired.

Having thus described my invention, what I claim as new and desire to secure by Letters Patent, is:

1. A band saw wheel comprising an annular stepped wheel rim, an annular tire rim internally stepped to complement said wheel rim and having inturned flanges at its edges, said tire rim having a removable forced engagement with said wheel rim, tire facing anchoring members formed of sheet metal strips of approximately the width of and embracing the said steps of said tire rim and spot-welded thereto, said anchoring members having rows of loop-like anchoring elements struck up therefrom, the anchoring elements of adjacent rows of the strips being disposed in alternating relation, and a tire facing molded and vulcanized on said tire rim with the said anchoring elements embedded therein.

2. A band saw wheel comprising an annular stepped wheel rim, an annular tire rim internally stepped to complement said wheel rim and having inturned flanges at its edges, said tire rim having a removable forced engagement with said wheel rim, tire facing anchoring members formed of sheet metal strips of approximately the width of and embracing the said steps of said tire rim and spot-welded thereto, said anchoring members having anchoring elements struck up therefrom, and a tire facing molded and vulcanized on said tire rim with the said anchoring elements embedded therein.

3. A band saw wheel comprising an annular stepped wheel rim, an annular tire rim internally stepped to complement said wheel rim, said tire rim having a removable forced engagement with said wheel rim, tire facing anchoring members formed of metal strips embracing the said steps of said wheel rim and fixed thereto, said anchoring members having loop-like anchoring elements struck up therefrom and separated therefrom by side slits, the bight portions of said anchoring elements being annular, and a tire facing for said tire rim having said anchoring elements embedded therein.

4. A band saw tire comprising an annular stepped tire rim, tire facing anchoring members formed of metal strips of width approximating the width of the steps embracing said rim and fixed thereto, said anchoring members having loop-like anchoring elements struck up therefrom, the bight portions of said anchoring elements being annular, and a tire facing for said tire rim having said anchoring elements embedded therein.

5. A band saw tire comprising an annular stepped tire rim, tire facing anchoring members formed of metal strips of width approximating the width of the steps embracing said rim and fixed thereto, said anchoring members having anchoring elements struck up therefrom, and a tire facing for said tire rim having said anchoring elements embedded therein.

6. A band saw tire comprising an annular tire rim having inturned flanges at its edges, a metal tire facing anchoring member embracing the said tire rim and spot-welded thereto, said anchoring member having rows of loop-like anchoring elements struck up therefrom and separated therefrom by side slits, the bight portions of said anchoring elements being annular and substantially spaced from the base portions of the anchoring member, the anchoring elements of adjacent rows being disposed in alternating relation, and a tire facing molded and vulcanized on said tire rim with the said anchoring elements embedded therein.

7. A band saw tire comprising an annular tire rim having inturned flanges at its edges, a metal tire facing anchoring member embracing the said tire rim and spot-welded thereto, said anchoring member having loop-like anchoring elements struck up therefrom and separated therefrom by side slits, the bight portions of said anchoring elements being annular and substantially spaced from the base portions of the anchoring member, and a tire facing molded and vulcanized on said tire rim with the said anchoring elements embedded therein.

8. A band saw tire comprising an annular tire rim having inturned flanges at its edges, a metal tire facing anchoring member embracing the said tire rim and spot-welded thereto, said anchoring member having loop-like anchoring elements struck up therefrom and separated therefrom by side slits, the bight portions of said anchoring elements being annular and substantially spaced from the base portions of the anchoring member, the holes therein being elongated circumferentially of the tire, and a tire facing molded and vulcanized on said tire rim with the said anchoring elements embedded therein.

9. A band saw tire comprising an annular tire rim, a tire facing anchoring member fixedly secured to the tire rim, said anchoring member having rows of loop-like anchoring elements struck up therefrom and separated therefrom by side slits, the bight portions of said anchoring elements being annular and substantially spaced from the base portion of the anchoring member, the anchoring elements of adjacent rows being disposed in alternating relation, and a tire facing for said tire rim having said anchoring elements embedded therein.

10. A band saw tire comprising an annular tire rim, a tire facing anchoring member fixedly secured to said tire rim, said anchoring member having anchoring elements struck up therefrom and separated therefrom by side slits, the bight portions of said anchoring elements being annular and substantially spaced from the base portion of the anchoring member, and a tire facing for said tire rim having said anchoring elements embedded therein.

11. A band saw tire comprising an annular tire rim, a tire facing anchoring member fixedly secured to said tire rim, said anchoring member having anchoring elements struck up therefrom and separated therefrom by side slits, the bight portions of said anchoring elements being annular and substantially spaced from the base portion of the anchoring member, the holes therein being elongated, and a tire facing for said tire rim having said anchoring elements embedded therein.

CARL E. TANNEWITZ.